United States Patent
Aigner et al.

(10) Patent No.: US 11,667,198 B2
(45) Date of Patent: Jun. 6, 2023

(54) COMPOSITE OF DYNAMIC LIGHT PROJECTIONS AND SURFACE STRUCTURES IN THE VEHICLE INTERIOR

(71) Applicant: Bayerische Motoren Werke Aktiengesellschaft, Munich (DE)

(72) Inventors: Ralf Aigner, Ergolding (DE); Alexander Peters, Munich (DE); Bruno Roth, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/475,411

(22) Filed: Sep. 15, 2021

(65) Prior Publication Data

US 2022/0080830 A1 Mar. 17, 2022

(30) Foreign Application Priority Data

Sep. 16, 2020 (DE) ...................... 10 2020 124 152.6

(51) Int. Cl.
*B60K 35/00* (2006.01)
*H04N 9/31* (2006.01)

(52) U.S. Cl.
CPC ...... *B60K 35/00* (2013.01); *B60K 2370/1434* (2019.05); *B60K 2370/1442* (2019.05);
(Continued)

(58) Field of Classification Search
CPC .... B60K 2370/1442; B60K 2370/1468; B60K 2370/155; B60K 2370/177;
(Continued)

(56) References Cited

U.S. PATENT DOCUMENTS 8,142,030 B2 * 3/2012 Bowden ............... G01C 21/365
353/15
8,576,199 B1 * 11/2013 Pryor ..................... B60K 35/00
178/18.09

(Continued)

FOREIGN PATENT DOCUMENTS

| DE | 10 2018 210 639 A1 | 1/2020 |
| EP | 1 798 588 A1 | 6/2007 |
| WO | WO-2019030660 A1 * | 2/2019 ............. B60K 35/00 |

OTHER PUBLICATIONS

German-language Search Report issued in German Application No. 10 2020 124 152 6 dated Jul. 14, 2021 with partial English translation (12 pages).

*Primary Examiner* — John W Miller
*Assistant Examiner* — Humam M Satti
(74) *Attorney, Agent, or Firm* — Crowell & Moring LLP

(57) ABSTRACT

A device includes a control unit and a projection surface. The projection surface has at least one first subsection, which is associated with at least one of the functional elements and which covers the at least one functional element toward the interior of the vehicle, so that the at least one functional element is not visible. The control unit and the projection device project an image, a graphic, or an animation according to an item of information associated with the at least one functional element on the at least one first subsection. The projection surface also has at least one second subsection, which surrounds the at least one first subsection. The control unit and the projection device project an image, a graphic, or an animation according to an illumination scenario and/or according to items of information to be displayed on the at least one second subsection.

10 Claims, 3 Drawing Sheets

(52) U.S. Cl.
CPC  *B60K 2370/1468* (2019.05); *B60K 2370/155* (2019.05); *B60K 2370/1531* (2019.05); *B60K 2370/166* (2019.05); *B60K 2370/334* (2019.05); *H04N 9/3147* (2013.01)

(58) Field of Classification Search
CPC .......... B60K 2370/31; B60K 2370/334; B60K 35/00; B60K 2370/1434; B60K 2370/1531; B60K 2370/166; H04N 9/3147; H04N 9/3182; H04N 9/3194
See application file for complete search history.

(56) References Cited

U.S. PATENT DOCUMENTS

| | | | | |
|---|---|---|---|---|
| 2005/0177287 A1* | 8/2005 | Wang | ...................... | B60K 37/06 700/83 |
| 2005/0276448 A1* | 12/2005 | Pryor | ...................... | G06F 3/0312 382/103 |
| 2008/0129707 A1* | 6/2008 | Pryor | ...................... | G06F 3/0312 345/175 |
| 2009/0021490 A1* | 1/2009 | Stickels | .................. | B64C 19/00 345/173 |
| 2011/0050587 A1* | 3/2011 | Natanzon | ............ | G06F 3/04842 345/173 |
| 2013/0179811 A1* | 7/2013 | Nagara | .................. | B60K 35/00 715/765 |
| 2014/0200762 A1* | 7/2014 | Shaw | ...................... | B60K 35/00 701/1 |
| 2015/0042959 A1* | 2/2015 | Leary | ..................... | G03B 21/16 353/13 |
| 2018/0373350 A1* | 12/2018 | Rao | ...................... | B60K 35/00 |
| 2019/0361332 A1* | 11/2019 | Kurota | .................. | H04N 9/3155 |
| 2020/0002001 A1 | 1/2020 | Bauer et al. | | |
| 2020/0079218 A1* | 3/2020 | Hélot | .................. | G06F 3/04847 |
| 2020/0096356 A1* | 3/2020 | Kirsch | .................... | G10L 17/00 |
| 2020/0192466 A1* | 6/2020 | Vai | ........................ | G06F 3/0425 |

* cited by examiner

COMPOSITE OF DYNAMIC LIGHT PROJECTIONS AND SURFACE STRUCTURES IN THE VEHICLE INTERIOR

CROSS REFERENCE TO RELATED APPLICATION

This application claims priority under 35 U.S.C. § 119 from German Patent Application No. 10 2020 124 152.6, filed Sep. 16, 2020, the entire disclosure of which is herein expressly incorporated by reference.

BACKGROUND AND SUMMARY OF THE INVENTION

The invention relates to a device for displaying dynamic illumination scenarios, items of visual information, and animations in an interior of a vehicle and for displaying items of information for functional elements of the vehicle.

Increased demands on design and function integration in vehicles and new mobility scenarios, for example, due to automated driving and its precursors require new possibilities for displaying items of information in vehicles and entertaining the passengers of the vehicle.

In particular with regard to automated driving or its precursors, in which no or only a reduced intervention of the driver is still necessary, the activities of the driver and of the passengers in general in the vehicle interior change.

Moreover, new experiences are requested for occupation and for entertainment.

In addition, more and more functions and operating elements are additionally being integrated into vehicles, which is problematic, however, since the persons in the vehicle are not to be overwhelmed by the options or the technology in general and the functional components and the operation thereof therefore have to be integrated in the vehicle in the most intuitive and inconspicuous manner possible. The technology is therefore preferably to step into the background and is to be concealed or "invisible" as much as possible.

Potentials but also user problems result due to the concealment of operating interfaces and displays, because it is not immediately recognizable where the functions are operable and which status they are in.

A plurality of approaches is already known for this purpose from the prior art. Decorative parts which can be backlit are often used to conceal functions or the operation thereof, in which operating elements are only made visible by an illumination provided for this purpose, which is arranged behind the decorative part, so that the operating elements disappear or are not visible to the user when the illumination is deactivated. However, such concepts usually have a complex structure and are therefore costly to produce.

To create new illumination concepts, providing them by backlighting of decorative parts or also by a special interior illumination is also already known, wherein in this way usually only a static illumination or at most dimming of the existing interior illumination can be represented.

The invention is therefore based on the object of overcoming the above-mentioned disadvantages and providing a device for displaying dynamic illumination scenarios, items of visual information, and animations in an interior of a vehicle and for displaying items of information for functional elements of the vehicle, which is not only flexibly usable, but also permits the display of complex visualizations with simultaneous integration of interior elements and functional elements of the vehicle.

This object is achieved by the claimed invention.

According to an embodiment of the invention, a device is proposed for displaying dynamic illumination scenarios, items of visual information, and animations in an interior of a vehicle and for displaying items of information for functional elements of the vehicle. The device has a projection surface pointing or facing toward the interior of the vehicle, a projection device, and a control unit for controlling the projection device. The projection device is moreover designed to project images, graphics or symbols, or animations on the projection surface, the images, which can also include color profiles or simple brightness profiles, graphics, and/or symbols can be animated and/or, for example, dynamically adapted to an environment of the vehicle or other external data sources. It is furthermore provided according to an embodiment of the invention that the projection surface has at least one first subsection, which is associated with at least one of the functional elements of the vehicle and which covers the at least one functional element toward the interior of the vehicle. Accordingly, the at least one functional element is not visible to a person located in the vehicle or to a passenger, for which purpose the projection surface can be made essentially light opaque. The control unit and the projection device are designed to project an image, a graphic, or an animation according to an item of information associated with the at least one functional element on the at least one first subsection. For this purpose, the projection device is preferably activated by the control unit in such a way that the projected image depicts, in the region of the first subsection, the associated item of information, which can reflect, for example, a status of the functional element, or also depicts a symbol associated with the functional element, by which an operating element for operating the functional element is identified. Accordingly, directly associated items of information are allocated by the projection device controlled by the control unit to the at least one covered functional element, so that a "local" information reproduction of systems and functional states with a local reference is enabled. In addition, the projection surface has at least one second subsection, which surrounds the at least one first subsection, wherein the control unit and the projection device are designed to project, on the at least one second subsection, an image, a graphic, or an animation according to an illumination scenario and/or according to items of information which can be visualized and are to be displayed. The projection device can in turn be activated by the control unit in such a way that it projects images on the second subsection according to, for example, a selectable illumination scenario or a selectable animation. Upon the projection of a corresponding image on the second subsection, the first subsection or the first subsections can be left out by a corresponding selection of the image to be projected or can contain the respective specific items of information or graphics corresponding to the respective first subsections.

The functional elements can be, for example, sensors, climate control flaps, outflow openings, surface coolers, surface heaters, loudspeakers, or the like concealed behind the projection surface or concealed thereby.

It is particularly advantageous if the projection device is designed to project exclusively symbols in the at least one first subsection and furthermore to project exclusively gradual brightness profiles in the at least one second subsection with the exception of the symbols provided in the first subsections.

According to one advantageous refinement of the invention, the device furthermore comprises at least one paneling element defining a part of the projection surface, which provides at least a part of the projection surface toward the interior.

It is preferably provided that the paneling element has a three-dimensional shape or component geometry. For example, the paneling element can extend in the region of a transition between lateral vehicle regions in which the doors are arranged or the vehicle columns to the vehicle bottom or the vehicle ceiling and can have a corresponding shape for this purpose. The paneling element can accordingly also form the vehicle roof lining here. Since the paneling element provides the projection surface toward the interior, the projection surface also has a three-dimensional surface profile and is not flat or is not completely in a single plane.

A particularly attractive and thus advantageous illumination effect is achieved if the paneling element is formed from a surface material and the projection surface preferably has a surface structure, which is defined by the surface material, over the entire surface. The surface material can be a textile, for example, wherein the surface structure is determined by a planar formation formed from the textile, which can be, for example, a woven fabric, knitted fabric, knit, mesh, and the like. In addition to a textile as the surface material, however, other materials also come into consideration, for example veneers. The image projected on the respective section or the graphic or the animation can be adapted in each case to the surface material to obtain a recordability or readability of the displayed items of information and to emphasize the respective surface material or the surface structure formed thereby.

In addition to the general component geometry of the paneling element, one advantageous embodiment alternatively or additionally provides that the paneling element has a geometry toward the interior which defines a surface geometry of the projection surface. The surface geometry is defined by at least one protrusion extending over the projection surface, so that the projection surface has lower regions and higher regions due to the at least one protrusion. The higher regions furthermore form a pattern extending over the projection surface and preferably over the entire projection surface.

If such a pattern extending over the projection surface is provided, one refinement of the device provides that the control unit and the projection device are designed or the projection device is activated by the control unit in such a way that images, graphics, or animations different from one another are each projected on the lower regions and higher regions, so that specific and predetermined illumination patterns and/or items of visual information are projected in the regions, by which a predetermined illumination scenario is provided. For example, the higher or lower regions can also remain unilluminated, so that the pattern formed by the respective regions stands out and contributes to the visual experience.

It is particularly advantageous if a gradual brightness profile from light to dark is projected in each of the lower regions and the higher regions remain free of projection since a shadowing effect results due to the brightness profile, which is amplified by the unilluminated higher regions, so that it appears as if the higher regions were casting a shadow into the lower regions according to a preselected illumination scenario.

It can moreover be advantageous that the paneling element is an interior component and/or the projection surface forms at least a part of a surface of at least one interior component. The projection surface can extend, for example, over multiple interior components, so that the transition between the components can also be concealed by a corresponding illumination scenario. Alternatively, the projection surface can also be provided only on a single interior component, such as the roof lining. For example, the projection surface can also be provided on one or more of the door panels, the dashboard, or the center console and combinations thereof.

For example, various types of video projectors or projectors can be used as projection devices.

To ensure that a complete projection is possible on the projection surface, in a further variant of the device, a plurality of projection devices is provided in the interior, which are designed, controlled by the control unit, to project images, graphics, and/or symbols on the projection surface jointly or alternately and as a function of vehicle parameters and/or a position of a person located in the vehicle. On the one hand, it can thus be ensured that images and the like are also projectable over the full surface on a projection surface having complex three-dimensional profile and, on the other hand, that in spite of possible shading of the projection surface by the person located in the vehicle, the projection surface can be illuminated. The position of the person is preferably also understood as their posture here, which is detectable by a camera system, for example.

Furthermore, the device can have an input device, for example a camera or a sensor arranged under the projection surface and thus concealed, which is designed to detect a touch of the projection surface and coordinates of the touch on the projection surface. The touch detection and the coordinates with respect to the projection surface can be relayed to the control unit, which activates the functional elements of the vehicle and/or the projection device based thereon. The input device can also be a part of a functional element of the vehicle. For example, the input device can be a contactlessly operating sensor, which provides a switch function for switching a functional element, wherein the state of the switch function or the functional element is displayable by way of the device as projected information.

In particular the illumination scenario can moreover be selectable from a plurality of scenarios, wherein one of the scenarios simulates a natural light source over the course of time or a shadow generated by such a light source in the vehicle and in particular on the surface geometry of the projection surface. The simulation of the natural light source, such as the sun, can be generated by a corresponding illumination or the projection of brightness curves or by the projection of a complex image.

For example, a virtual sun position is displayable by a moving, virtual sun in the interior displayed by way of the projection. The virtual sun can move according to a permanently stored sequence which can be dependent on a selectable location, wherein the position and/or orientation of the vehicle in relation to the selected location can be dynamically considered and readjusted during the journey. In accordance with the virtual sun, a shadow matching with the sun position can then be generated in the vehicle interior or on the projection surface.

In particular in conjunction with the at least one protrusion extending over the projection surface, due to which higher and lower regions result, an illumination profile or color profile can be projected precisely in position in each of the lower regions of the projection surface, whereby a strengthened shadow impression is generated in the lower regions or in the depressions between the higher regions. The virtual shadow thus also travels due to a radial travel of the profile. The impression can be generated, strengthened, or weakened in combination with the standard illumination of the interior, which generates a natural shadow in the vehicle.

In summary, it is therefore possible by way of an advantageous refinement of the device to project a combination of a functional display and entertainment correctly matching on a 2.5D-3D shaped surface, i.e. the projection surface in the vehicle interior, wherein the surface is defined by its material, its topology (surface geometry), and its structure, for example, a wood-grain, depressions, indentations, webs, joints, and the like. System status feedback messages and new, natural illumination experiences can thus be generated and assisted by the projection, so that, on the one hand, a display of system and functional statuses in surfaces with local reference and, on the other hand, an experience of a global, external, natural light source is displayable by a virtual, traveling shadow.

The above-disclosed features are combinable as desired, insofar as this is technically possible and they are not contradictory to one another.

Other objects, advantages and novel features of the present invention will become apparent from the following detailed description of one or more preferred embodiments when considered in conjunction with the accompanying drawings.

The figures are exemplary and schematic. Identical reference signs in the figures indicate identical functional and/or structural features.

DETAILED DESCRIPTION OF THE DRAWINGS

A detail of a paneling component or a projection surface 10 provided by it toward the interior of the vehicle is illustrated by the figures by way of example, wherein the paneling component can be, for example, a side panel of a vehicle door.

Figure 1:
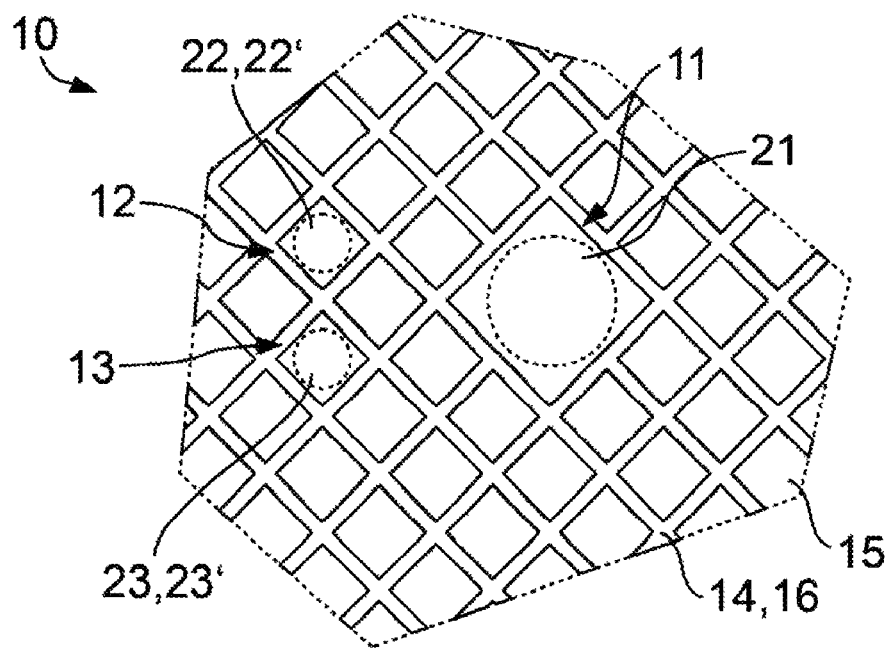
FIG. 1 shows a projection surface having functional elements arranged behind it.

FIG. 1 shows a projection surface 10, on which no image or the like is projected, so that the paneling component has a simple surface defined by its material, over which, however, a plurality of protrusions 14 extend, by which a pattern is formed on the projection surface 10. Lower regions 15 and higher regions 16 are formed on the surface of the paneling component facing toward the interior by the protrusions 14, which form a network or rhomboid pattern. Functional elements 21, 22, 23 are arranged behind the projection surface 10, which are concealed by the projection surface 10, however, and are not visible in the interior of the vehicle.

In the present case, the functional element is an outlet 21 of a climate control system, from which, for example, cold or warm air can flow through the paneling component or through the projection surface 10 into the vehicle interior. The further functional elements are switches 22, 23 in the present case, by which functions of the vehicle and, for example, functions of the climate control system are controllable.

In the variant depicted by the figures, the device furthermore comprises sensors 22', 23' as part of the functional elements 22, 23, by which a touch of the respective adjoining section of the projection surface 10 can be detected contactlessly.

Due to the concealment of the functional elements 21, 22, 23, they can be integrated completely invisibly into the paneling component. However, it is problematic in this case that they are not intuitively operable and items of information, such as the status of the respective functional component, are not detectable.

In addition to the display of various illumination scenarios for entertainment purposes, items of information on the functional elements 21, 22, 23 can also be displayed by the device according to an embodiment of the invention.

For this purpose, the projection surface 10 has multiple first subsections 11, 12, 13 and a second subsection surrounding them, wherein a first subsection 11, 12, 13 is respectively associated with one functional element 21, 22, 23 and the second subsection covers the entire projection surface 10.

Figure 2:
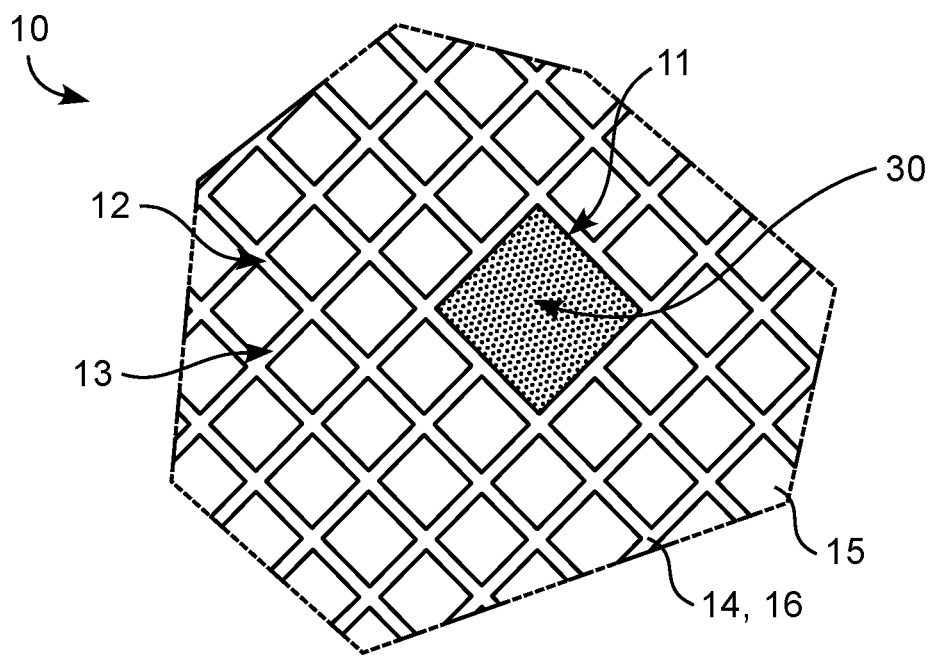
FIG. 2 shows the projection surface having a first illumination scenario.

In FIG. 2, for example, a first illumination scenario 30 is shown, in which only the first subsection 11, which is associated with the outlet 21, is illuminated or has an image applied to it by the projection device. Displaying items of information associated with the outlet 21 of the climate control system, for example, the status (on or off) and the temperature (warm or cold) is thus enabled. For this purpose, the first subsection 11 can be illuminated blue by the projection device to symbolize cooling by way of the outlet 21. For example, a fan symbol, a temperature, or the like could also be projected in the associated first subsection 11 or in the lower region which defines the first subsection 11.

The further first subsections 12, 13 are unilluminated in this case and the functional elements 22, 23 arranged behind them are invisible, as long as they are not required.

Figure 4:
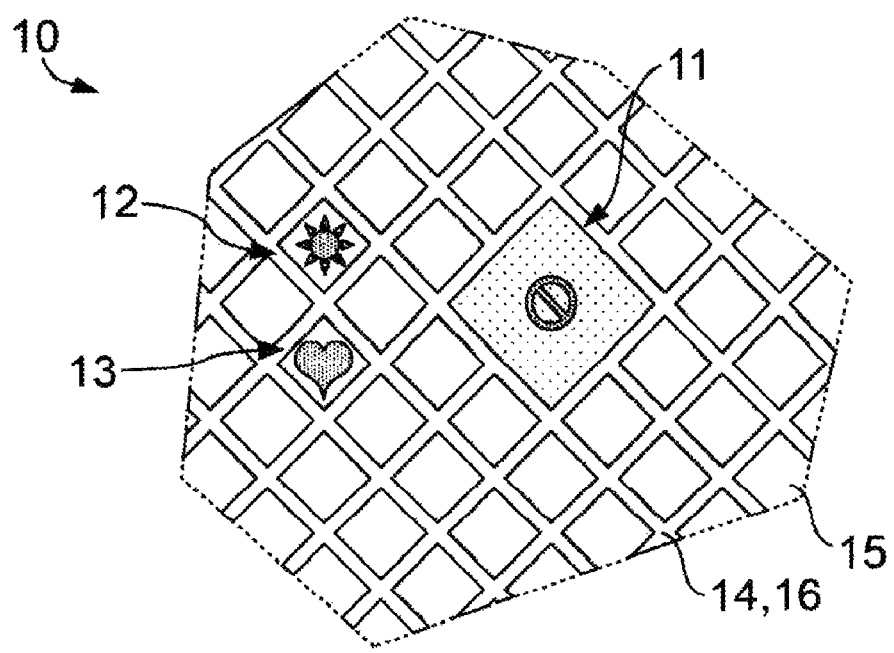
FIG. 4 shows the projection surface having a third illumination scenario.

If the functional elements or the switch elements 22, 23 are to be visible and thus operable for a passenger or the driver of the vehicle, for example, symbols can be projected in the respective subsection 22, 23, as shown in FIG. 4.

Figure 3:
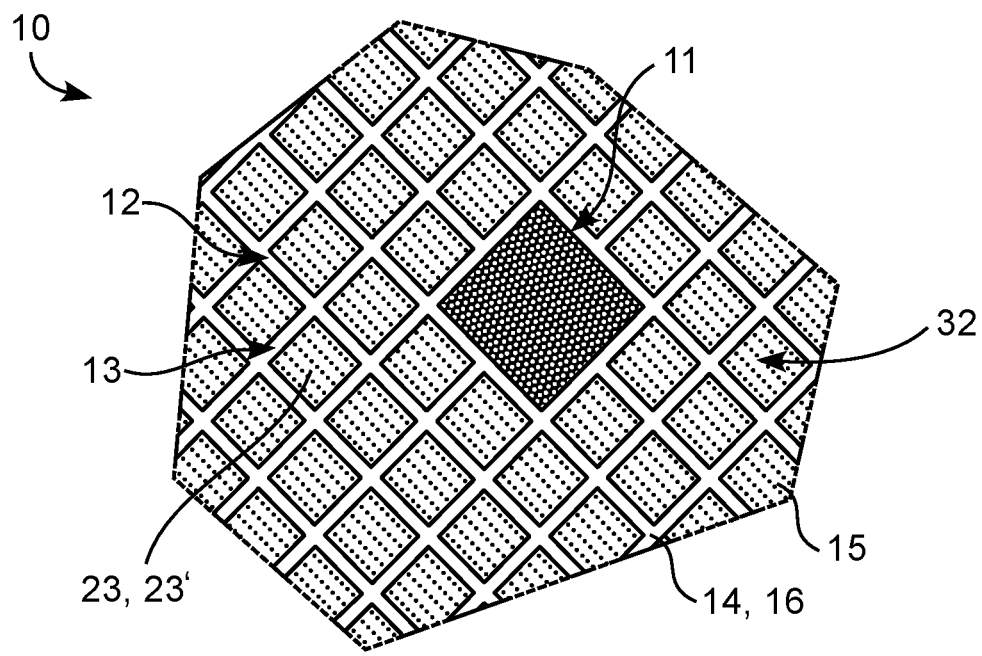
FIG. 3 shows the projection surface having a second illumination scenario.

The depiction of a second illumination scenario 32 is shown in FIG. 3, in which a predetermined color or brightness profile is projected in the lower regions 15 between the protrusions 14 over the entire second subsection. An identical or a differing profile can be projected in each individual indentation. In particular upon the use of a gradual brightness profile from light to dark simulating a shadow, this shadow effect is optically strengthened by the protrusions 14 located between the low regions 15. Differing or additional images, graphics, or animations can be projected in each of the first regions 11, 12, 13.

Figure 5:
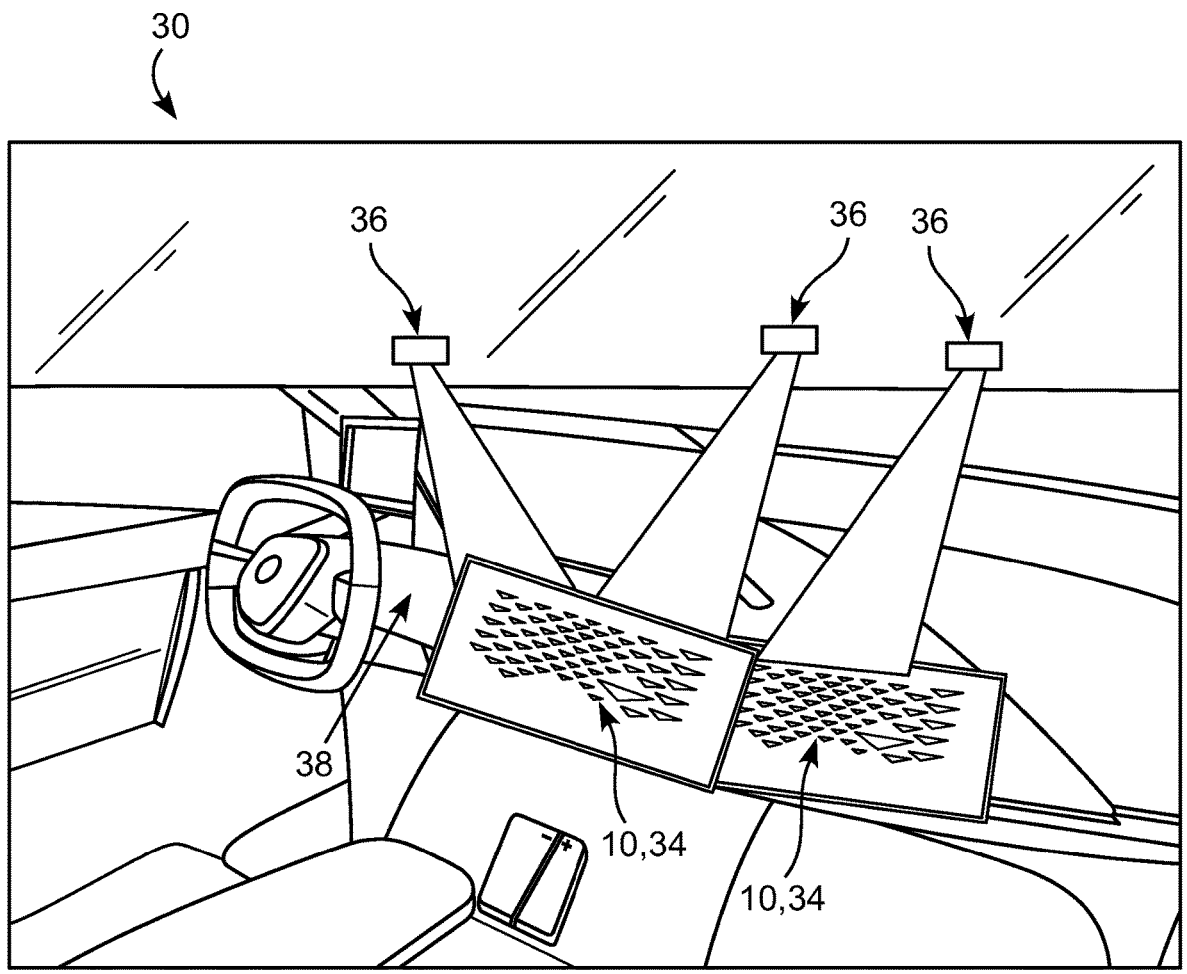
FIG. 5 shows a device for displaying dynamic illumination scenarios.

FIG. 5 shows a device 30 for displaying dynamic illumination scenarios. The device 30 includes a paneling element 38, projection surfaces 10, and projection devices 36. Each of the projection surfaces 10 may include an input device 34, such as a sensor arranged underneath the projection surface 10, that is configured to detect a touch of the projection surface 10 and coordinates of the touch on the projection surface 10.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for displaying dynamic illumination scenarios, items of visual information, and animations in an interior of a vehicle and for displaying items of information for functional elements of the vehicle, the device comprising:
   a projection surface pointing toward the interior of the vehicle,
   a projection device, and
   a controller for controlling the projection device, wherein:
      the projection device is configured to project images, graphics, or animations on the projection surface,
      the projection surface has at least one first subsection, which is associated with at least one of the functional elements and which covers the at least one functional element toward the interior of the vehicle, so that the at least one functional element is not visible,
      the controller and the projection device are configured to project a first image, a first graphic, or a first animation according to an item of information associated with the at least one functional element on the at least one first subsection,
      the projection surface has at least one second subsection, which surrounds the at least one first subsection,
      the controller and the projection device are configured to project a second image, a second graphic, or a second animation according to at least one of an illumination scenario or items of information to be displayed on the at least one second subsection.

2. The device according to claim 1, further comprising:
   a paneling element that provides at least the part of the projection surface toward the interior.

3. The device according to claim 2, wherein:
   the paneling element has a three-dimensional component geometry, and
   the projection surface has a three-dimensional surface profile and is not flat.

4. The device according to claim 2, wherein:
   the paneling element is formed from a surface material, and
   the projection surface has a surface structure that is defined by the surface material.

5. The device according to claim 2, wherein:
   the paneling element has a geometry toward the interior that defines a surface geometry of the projection surface,
   the surface geometry is defined by at least one protrusion extending over the projection surface,
   the projection surface has lower regions and higher regions due to the at least one protrusion, and
   the higher regions form a pattern extending over the projection surface.

6. The device according to claim 5,
   wherein the controller and the projection device are configured to project images, graphics, or animations each differing from one another on the lower regions and the higher regions.

7. The device according to claim 2, wherein at least one of:
   the paneling element is an interior component, or
   the projection surface forms at least a part of a surface of at least one interior component.

8. The device according to claim 1, further comprising:
   a plurality of projection devices that are provided in the interior, wherein the plurality of projection devices are controlled by the controller, to project at least one of images, graphics, or symbols on the projection surface jointly or alternately and as a function of at least one of vehicle parameters or a position of a person located in the vehicle.

9. The device according to claim 1, further comprising:
   an input device that is configured to detect a touch of the projection surface and coordinates of the touch on the projection surface.

10. The device according to claim 1,
    wherein the illumination scenario is selectable from a plurality of scenarios and one of the scenarios simulates a natural light source over a course of time.

* * * * *